(12) United States Patent
Amada et al.

(10) Patent No.: US 7,068,697 B1
(45) Date of Patent: Jun. 27, 2006

(54) ADJUSTABLE FLOW GUIDE TO ACCOMMODATE ELECTRODE EROSION IN A GAS DISCHARGE LASER

(75) Inventors: Yoshiho Amada, San Diego, CA (US); Richard G. Morton, San Diego, CA (US); Bryan G. Moosman, San Marcos, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 11/239,581

(22) Filed: Sep. 28, 2005

(51) Int. Cl.
*H01S 3/22* (2006.01)

(52) U.S. Cl. .......................................... 372/58; 372/55
(58) Field of Classification Search .................. 372/55, 372/57, 58
See application file for complete search history.

(56) References Cited

U.S. PATENT DOCUMENTS

| | | | | |
|---|---|---|---|---|
| 4,217,560 A | * | 8/1980 | Kosyrev et al. ............... | 372/58 |
| 5,684,821 A | * | 11/1997 | Murray et al. ................ | 372/84 |
| 6,317,447 B1 | * | 11/2001 | Partlo et al. .................. | 372/57 |
| 6,414,979 B1 | * | 7/2002 | Ujazdowski et al. .......... | 372/87 |
| 6,466,599 B1 | * | 10/2002 | Bragin et al. ................. | 372/58 |
| 6,466,602 B1 | * | 10/2002 | Fleurov et al. ............... | 372/87 |
| 6,914,919 B1 | * | 7/2005 | Watson et al. ................ | 372/25 |

* cited by examiner

*Primary Examiner*—James Menefee
(74) *Attorney, Agent, or Firm*—William C. Cray; Matthew K. Hillman

(57) ABSTRACT

A laser and method for operating a laser and disclosed. The laser may include a first discharge electrode and a second discharge electrode positioned at a distance from the first electrode. A laserable gas may be provided together with a circulation system to flow the gas into a space between the electrodes. A voltage source may be connected to the electrodes for creating a discharge in the space; and a flow guide having a guide surface in contact with the gas may be provided that is guide selectively moveable relative to the first electrode to guide a flow of gas into the space. In one implementation, the flow guide directs flow toward an extremity of the first electrode and is adjustable to direct flow toward the extremity as the first electrode wears.

21 Claims, 3 Drawing Sheets

ADJUSTABLE FLOW GUIDE TO ACCOMMODATE ELECTRODE EROSION IN A GAS DISCHARGE LASER

FIELD OF THE INVENTION

The present invention relates to pulsed, gas discharge lasers. The present invention is particularly, but not exclusively useful as a gas discharge laser having one or more discharge electrodes that wear down (e.g. erode) over the lifetime of the laser.

BACKGROUND OF THE INVENTION

Modern pulsed, high repetition rate, gas discharge lasers such as ArF XeF and Krf excimer lasers and molecular fluorine lasers generally employ a pair of spaced apart, elongated (e.g. 30 cm long) main discharge electrodes to initiate lasing in a gaseous material. For example, each pulse may be produced by applying a very high, voltage potential across the electrodes with a power supply which causes a discharge between the electrodes having a duration of about 30 nanoseconds. A typical discharge may deposit about 2.5 J of energy into a gain region that is about 20 mm high, 3 mm wide and 500 mm long.

Each discharge alters the physical condition of the gas in the discharge region rendering the gas unsuitable for use in the next pulse. For this reason, a circulation system, which may include a high-speed cross-flow type fan, is typically provided to quickly exhaust "spent" gas from the discharge region immediately after a pulse and present a fresh portion of gas to the electrodes for the next pulse. Thus, at a pulse repetition rate in the range of 1000 Hz or greater, relatively high gas velocities are required to completely clear spent gas and debris prior to the next pulse.

In the absence of suitable precautions, the relatively high gas velocities that are required to exhaust all of the "spent" discharge gas are capable of creating turbulent flow. In particular, turbulence can develop near the discharge electrodes and cause undesirable arcing between the electrodes. This arcing, in turn, may result in poor laser performance, including, but not limited to, lowered pulse energy and lowered pulse-to-pulse energy stability. Heretofore, discharge chambers have been disclosed which include various permanently installed, non-adjustable, baffles, vanes and/or fairings to improve the aerodynamic geometry of the chamber and to reduce turbulence in the flow of laser gas. These features have also included non-adjustable fairings to minimize turbulent flow in and around the discharge electrodes, for example see U.S. Pat. No. 6,914,919, issued on Jul. 5, 2005 and titled, "Six To Ten KHZ, Or Greater Gas Discharge Laser System".

For the above-described arrangement (i.e. high voltage, high repetition rate gas discharge laser), erosion and/or other wear mechanisms that are operable during electrode discharge may cause one or both of the electrodes to lose mass and physically shorten over the life of a laser. Indeed, currently available gas discharge lasers may have chambers having a useful life of 12 billion pulses or more. The significant shortening of the electrode (which may occur after only a half billion pulses or less) may create a geometrical mis-match between the electrode and any fairing or other surface feature that is provided to minimize turbulence in the flow of laser gas passing by the electrode. Although a small mis-match may be tolerable, larger mis-matches between the electrode and fairing can result in undesirable turbulent flow, arcing, and a corresponding reduction in laser performance.

With the above considerations in mind, Applicants disclose a laser and methods for operating a laser that adjust laser gas flow over the life of the laser to accommodate electrode shortening due to erosion.

SUMMARY OF THE INVENTION

A laser and method for operating a laser are disclosed. The laser may include a first discharge electrode and a second discharge electrode positioned at a distance from the first electrode. A laserable gas may be provided together with a circulation system to flow the gas into a space between the electrodes. A voltage source may be connected to the electrodes for creating a discharge in the space; and a flow guide having a guide surface in contact with the gas may be provided that is selectively moveable relative to the first electrode to guide a flow of gas into the space.

In one implementation, the flow guide directs flow toward an extremity of the first electrode and is adjustable to direct flow toward the extremity as the first electrode shortens due to erosion.

DETAILED DESCRIPTION OF PREFERRED EMBODIMENTS

Figure 1:
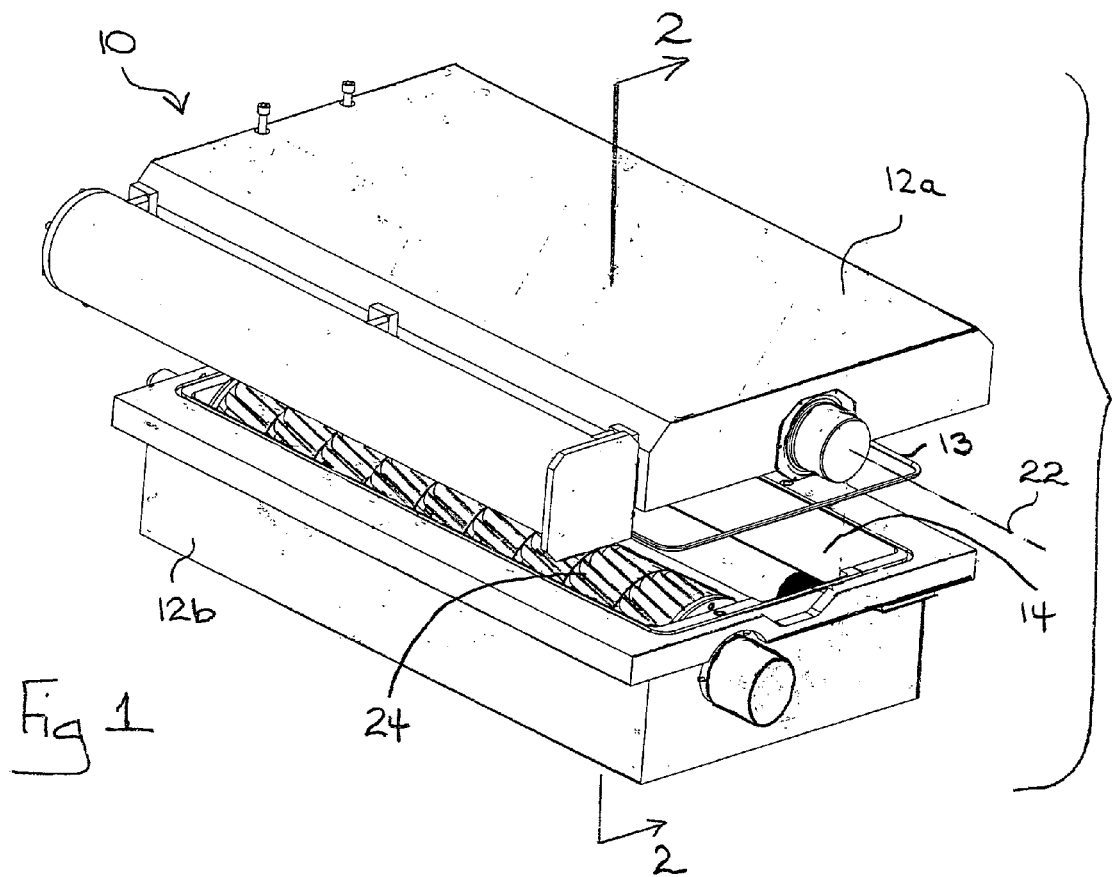
FIG. 1 shows an exploded, perspective view of a gas discharge laser chamber.

Referring initially to FIG. 1, a chamber for a pulsed, gas discharge laser, such as an excimer laser (e.g. KrF, ArF, XeF, XeCl, etc.) or molecular fluorine laser, is shown and generally designated 10. As shown, the chamber 10 typically includes a two-part chamber housing 12a,b that may be made of a relatively strong, corrosion resistant material, e.g. nickel plated aluminum, and is generally rectangular in construction with closed ends. With this structure, the housing components 12a,b and seal 13 may surround and enclose a volume 14 which may hold a laserable gas.

Figure 2:
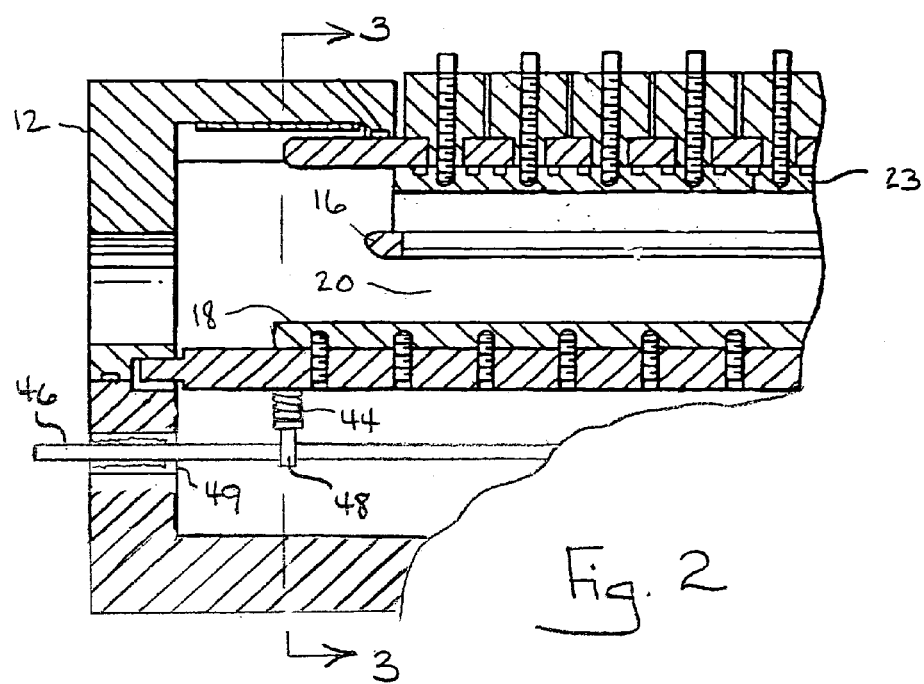
FIG. 2 shows a cross-sectional view of the gas discharge laser chamber of FIG. 1, as seen in the direction of line 2—2 in FIG. 1.

FIG. 2 shows that the chamber 10 may also include a gas discharge sub-system having two spaced apart electrodes 16, 18, one of which may be designated a cathode and the other an anode. With this arrangement, a gas discharge region 20 is established in the space between the electrodes 16, 18 which includes the laser's beam axis 22 (axis 22 shown in FIG. 1). Each electrode 16, 18 may be elongated, for example, to a length of about 40–80 cm and aligned in a direction generally parallel to the axis 22. In addition, one of the electrodes, (in this case electrode 18) may be slightly longer than the other (i.e. electrode 16). Thus, the gas discharge region 20 for the chamber 10 shown in FIGS. 1–3 is an elongated volume having a length approximately equal to the length of the shorter electrode (i.e. electrode 18 and a somewhat rectangular cross section, which may be for example, 3 mm wide by about 12 mm in the direction of electrode spacing for an ArF excimer laser.

FIG. 2 shows that electrical contact between the electrode 16 and housing 12 may be prevented by the use of an insulator 23, sometimes referred to as a main insulator, which may be made from a dielectric, e.g. ceramic material. In one implementation, electrode 18 may be maintained at a constant reference potential, e.g. ground potential, and electrode 16 may be biased relative to the reference potential to initiate an electric discharge in the gas discharge region 20. It is to be appreciated that other biasing schemes are possible.

Figure 3:
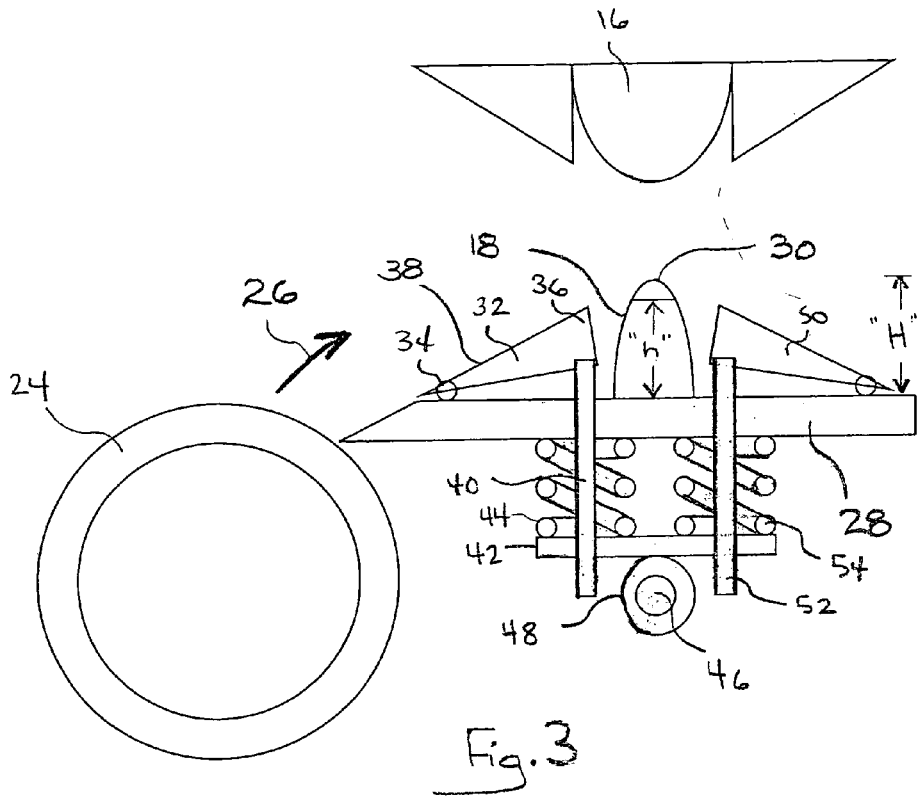
FIG. 3 shows a cross-sectional view of a portion of the gas discharge laser chamber of FIG. 1, as seen in the direction of line 3—3 in FIG. 2.

FIGS. 1 and 3 also show that the laser can include a gas circulation system, which may include a high-speed cross-flow type fan 24 that is sufficient to quickly exhaust "spent" gas from the discharge region 20 immediately after a pulse and present a fresh portion of gas to the electrodes 16, 18 for the next pulse. FIG. 3 shows that the fan 24 directs gas in the direction of arrow 26. Further details regarding a suitable gas circulation system for use in a high repetition rate, discharge laser are disclosed in U.S. Pat. No. 6,914,919, which is hereby incorporated by reference herein.

Figure 4:
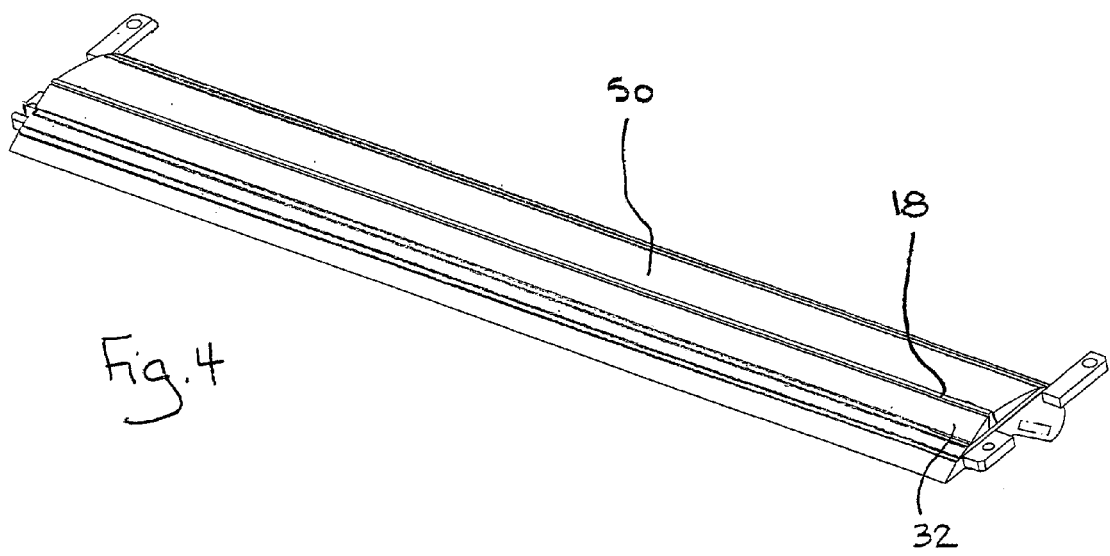
FIG. 4 shows a perspective, top view of an elongated electrode and adjustable flow guides.

Continuing with FIG. 3, it can be seen that the electrode 18 is mounted on a support member 28 and extends therefrom to an electrode extremity 30. It is contemplated that the electrode 18 may have an initial height, H, as shown and may shorten due to erosion and/or other operable wear mechanisms, to a subsequent height, h. FIGS. 3 and 4 also show that the laser may include a ceramic flow guide 32 which may have, for example, a triangular cross section normal to the direction of the laser axis 22. As best seen in FIG. 4, for the chamber 10, the flow guide 32 may be elongated and extend the length of the electrode 18.

FIG. 3 illustrates one possible adjustment mechanism for moving the flow guide 34 relative to the electrode 18. As shown there, the flow guide 34 may have an end 34 and an end 36. For the mechanism shown, the end 34 may be pivotally attached to the support member 28 allowing the flow guide 32 to rotate about the end 34 at the pivot relative to the support member 28. For example, a pivot joint may be established by forming a hole (not shown) in the flow guide 32 extending parallel to the laser axis 22 and inserting into the hole an appropriately sized pin (not shown) that is fixedly attached to the support member 28 allowing the flow guide 32 to rotate about the pin. Other arrangements are possible.

FIG. 3 further shows that the flow guide 32 may include an operative guide surface 38 that is in contact with and may direct the gas flow from the fan 26. For the chamber 10, the flow guide 32 may be oriented such that the guide surface 38 directs flow toward and past the extremity 30 of electrode 18 to minimize turbulent flow near the electrode 18. As indicated above, turbulent flow near an electrode may cause unwanted arcing during an electrode discharge. Functionally, the adjustment mechanism may be provided to move the flow guide 34 for the purpose of maintaining a flow that directed toward and past the extremity 30 of the electrode 18 as the electrode 18 shortens due to erosion and/or other wear mechanisms.

In greater structural detail, the adjustment mechanism shown in FIG. 3 may include a pull rod 40 that passes through a hole formed in the support member 28. One end of the pull rod 40 may be attached to the flow guide 32 at the end 36 and the other end of the pull rod 40 may be attached to a flange 42 for movement therewith. With this cooperation of structure, spring 44 may be interposed between flange 42 and support member 28. With this arrangement, end 36 of flow guide 32 is biased toward the support member 28. FIGS. 2 and 3 show that a cam operable mechanism 46 having cam surface 48 may be provided to selectively move flange 42 against the biasing force of the spring 44. In particular, rotation of the mechanism 46 moves flange 42, which in turn moves rod 40 and the end 36 of flow guide 32. One end of the cam operable mechanism may extend through the housing 12 through bellows 49 as shown in FIG. 2.

FIGS. 3 and 4 show that a flow guide 50 may be positioned downstream of the electrode 18 and adjusted to minimize turbulent flow near electrode 18. As shown, flow guide 50 may be adjusted using the same flange 42 and cam operable mechanism 46 used to adjust flow guide 32. In particular, rod 52 connects flange 42 to flow guide 50 and spring 54 biases flange 42 away from support member 28. FIG. 3 also shows that stationary flow guides 56, 58 may be used to reduce turbulent flow near electrode 16. As shown in FIG. 2, it may be beneficial to locate the adjustment mechanism near the end of the electrode 18 where little or no discharge occurs (note: electrode 16 is shorter than electrode 18). Also, a second adjustment mechanism (not shown) can be located at the other end of the chamber and operated by the same rod 46 (see FIG. 2).

OPERATION

For the chamber 10, it is contemplated that the electrode 18 may shorten over the life of the laser due erosion and other operable wear mechanisms. For example, in one application, the electrode 18 may be an anode of an anode-cathode pair and may be held at a reference potential, e.g. ground while the cathode is biased to create a discharge. For this arrangement, in some types of gas discharge systems, the anode may shorten considerable more than the cathode. Thus, an adjustable flow guide arrangement may be used for the anode in combination with stationary flow guides for the cathode. However, it is to be appreciated that the adjustable flow guides may be used on the anode, the cathode or both.

Adjustment of the flow guide(s) can be performed in response to one or more measured laser parameters, and may be performed either continuously or intermittently. Moreover, flow guide adjustment can be made manually, e.g. by service personnel, or automatically as part of a feedback control loop. In either case, adjustment can be made in response to a laser performance parameter including, but not necessarily limited to, pulse energy, pulse energy stability, pulse count (i.e. number of pulses since last adjustment or total number of pulses), or after a visual inspection of the electrode height or a visual indication that arcing is occurring.

Figure 5:
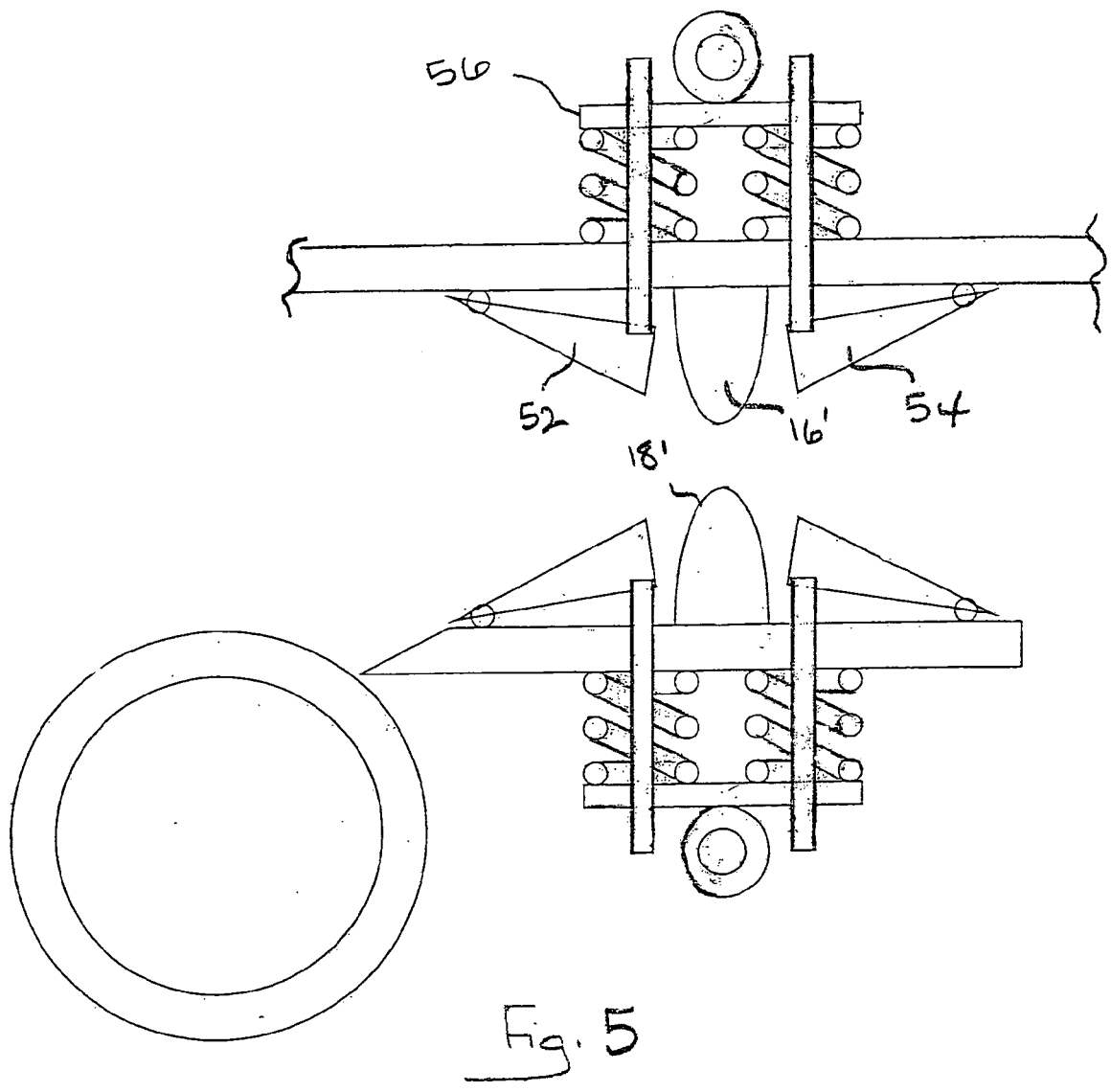
FIG. 5 shows a cross-sectional view as in FIG. 3 of an embodiment having adjustable field shaping elements to accommodate electrode erosion.

FIG. 5 illustrates another embodiment which field shaping elements 52, 54 may be adjustable positioned using positioning mechanism 56 to accommodate electrode wear. These elements 52, 54 may be made of a metal or ceramic and function to effect the shape of the electric field generated between the electrodes 16', 18' in a manner known in the pertinent art.

While the particular aspects of embodiment(s) described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art.

What is claimed is:

1. A laser comprising:
   a first discharge electrode;
   a second discharge electrode positioned at a distance from said first electrode;
   a laserable gas;
   a circulation system flowing said gas into a space between said electrodes;
   a voltage source connected to said electrodes for creating a discharge in said space; and
   a flow guide having a guide surface in contact with said gas, said flow guide selectively moveable relative to said first electrode to guide a flow of gas into said space.

2. A laser as recited in claim 1 wherein said flow guide is a first flow guide positioned upstream of said space and said laser further comprises a second flow guide positioned downstream of said space, said second flow selectively moveable relative to said first electrode to guide a flow of gas from said space.

3. A laser as recited in claim 1 wherein said flow guide directs flow toward an extremity of said first electrode and is adjustable to direct flow toward the extremity as the first electrode wears.

4. A laser as recited in claim 1 wherein:
   said laser further comprises a support member with said first electrode mounted on said support member and extending therefrom; and
   said flow guide has a first end and a second end with said first end pivotally attached to said support member.

5. A laser as recited in claim 4 wherein:
   said laser further comprises a means for biasing said second end of said flow guide toward from said support member.

6. A laser as recited in claim 5 wherein said biasing means comprises a spring.

7. A laser as recited in claim 6 wherein said laser comprises a cam-operated mechanism for adjusting the distance between said second end of said flow guide and said support member.

8. A laser as recited in claim 7 wherein said mechanism is operable in response to a control signal.

9. A laser comprising:
   a first discharge electrode;
   a second discharge electrode spaced from said first electrode and having an initial height, H, to establish an initial gap therebetween;
   a laserable gas;
   a circulation system flowing said gas into said gap;
   a voltage source connected to said electrodes for creating discharges in said gap, said discharges eroding said electrode to a height, h, with h<H;
   a flow guide system reconfigurable between a first configuration wherein said system directs said gas into said gap with said electrode at said height, H, and a second configuration wherein said system directs said gas into said gap with said electrode at said height, h.

10. A laser as recited in claim 9 wherein said flow guide system comprises a flow guide having a guide surface in contact with said gas, said flow guide selectively moveable relative to said second discharge electrode to guide a flow of gas into said gap.

11. A laser as recited in claim 9 wherein said flow guide system directs said gas into said gas to minimize turbulence at said second discharge electrode in said first configuration.

12. A laser as recited in claim 9 wherein;
   said laser further comprises a support member with said second discharge electrode mounted on said support member and extending therefrom; and
   said flow guide has a first end and a second end with said first end pivotally attached to said support member.

13. A laser as recited in claim 12 wherein:
   said laser further comprises a means for biasing said second end of said flow guide away from said support member and a mechanism for adjusting a distance between said second end of said flow guide and said support member.

14. A laser as recited in claim 13 wherein said mechanism is operable in response to a control signal.

15. A laser as recited in claim 13 wherein a pulse energy measurement is used to generate said control signal.

16. A method for operating a laser, said method comprising the acts of:
   providing a first discharge electrode;

positioning a second discharge electrode having an initial height, H, at a space from said first electrode to establish an initial gap therebetween;

activating a circulation system to flow a laserable gas into said gap;

establishing a series of voltage differentials across said electrodes to create a series of discharges in said gap, said discharges eroding said second discharge electrode to a height, h, with h<H; and reconfiguring a flow guide system from a first configuration wherein said system directs said gas into said gap with said electrode at said height, H, to a second configuration wherein said system directs said gas into said gap with said electrode at said height, h.

17. A method as recited in claim 16 wherein said flow guide system comprises a flow guide having a guide surface in contact with said gas, and said reconfiguring act comprises the act of selectively moving said flow guide relative to said second discharge electrode to guide a flow of gas into said gap.

18. A method as recited in claim 16 wherein said reconfiguring act directs said gas into said gas to minimize turbulence at said second discharge electrode in said first configuration.

19. A method as recited in claim 16 wherein;

said laser further comprises a support member with said second discharge electrode mounted on said support member and extending therefrom;

said flow guide has a first end and a second end with said first end pivotally attached to said support member; and said method further comprises the acts of:

biasing said second end of said flow guide away from said support member; and adjusting a distance between said second end of said flow guide and said support member.

20. A method as recited in claim 19 further comprising the acts of:

generating a control signal indicative of a height of said second discharge electrode; and performing said adjustment act in response to said control signal.

21. A laser comprising:

a first discharge electrode;

a second discharge electrode spaced from said first electrode and having an initial height, H, to establish an initial gap therebetween;

a laserable gas;

a voltage source connected to said electrodes for creating an electric field to create discharges in said gap, said discharges eroding said electrode to a height, h, with h<H; and a field shaping element moveable from a first position for shaping said electric field with said electrode at said height, H, and a second position for shaping said electric field with said electrode at said height, h.

* * * * *